United States Patent
Nishimura et al.

[11] Patent Number: 5,909,724
[45] Date of Patent: Jun. 8, 1999

[54] ENGINE CONTROL METHOD

[75] Inventors: Hirofumi Nishimura; Tomomi Watanabe, both of Hiroshima; Junichi Taga, Higashi-Hiroshima; Michihiro Imada, Hiroshima, all of Japan

[73] Assignee: Mazda Motor Corporation, Hiroshima, Japan

[21] Appl. No.: 08/826,806

[22] Filed: Mar. 25, 1997

[30] Foreign Application Priority Data

Mar. 29, 1996 [JP] Japan .................................... 8-078000

[51] Int. Cl.⁶ ............................. F02M 51/00; F82D 41/14
[52] U.S. Cl. ........................................... 123/436; 123/679
[58] Field of Search .................... 123/295, 436, 123/679

[56] References Cited

U.S. PATENT DOCUMENTS

| | | | |
|---|---|---|---|
| 5,560,336 | 10/1996 | Takahashi et al. | 123/436 |
| 5,605,132 | 2/1997 | Hori et al. | 123/436 |
| 5,630,397 | 5/1997 | Shimizu et al. | 123/436 |
| 5,638,278 | 6/1997 | Nishimura et al. | 123/436 |
| 5,670,713 | 9/1997 | Machida et al. | 123/436 |
| 5,687,692 | 11/1997 | Togai et al. | 123/436 |
| 5,720,260 | 2/1998 | Meyer et al. | 123/436 |
| 5,824,890 | 10/1998 | La Palm et al. | 123/436 |
| 5,828,976 | 10/1998 | Fukuchi et al. | 123/436 |
| 5,832,404 | 11/1998 | Amano | 123/436 |

FOREIGN PATENT DOCUMENTS 3-15645  1/1991  Japan .

*Primary Examiner*—Erick R. Solis
*Attorney, Agent, or Firm*—Martin Fleit

[57] ABSTRACT

An engine combustion condition judging method for detecting a crank angle speed of a multiple cylinder engine, for judging a combustion condition of each of cylinders of the engine based on the detection of the crank angle speed, wherein the improvement includes the steps of setting a predetermined crank angle range selectively determined within a range between a crank angle at which a combustion substantially terminate in a given cylinder and another crank angle at which a combustion substantially start in the next cylinder for detecting a crank angle speed property, and judging the combustion condition based on said crank angle speed property within the predetermined crank angle range. The combustion condition can be obtained reliably so that an appropriate A/F control can be accomplished irrespective of the engine operating condition.

16 Claims, 13 Drawing Sheets

$d\omega = \omega[i] - \omega[i-4]$

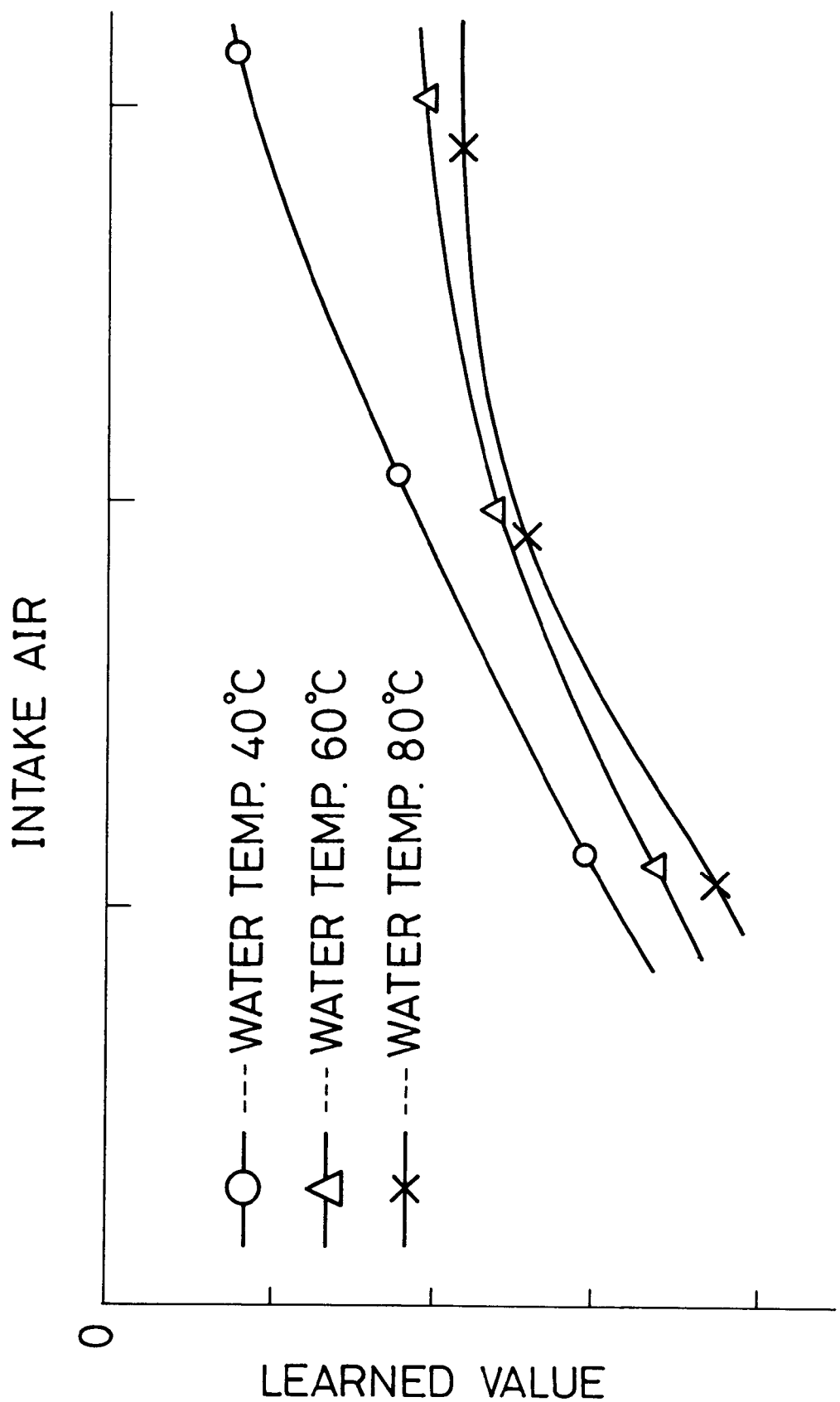

5,909,724

ENGINE CONTROL METHOD

BACKGROUND OF THE INVENTION

1. Field of the Invention

The present invention relates to an engine control method, in particular, to a method for judging engine combustion condition of cylinders based on a crank angle speed detected in a lean burn condition and the like, and for controlling the engine and to a control system based on the judgment of the combustion condition.

2. Related Art

Conventionally, a method and system for detecting a crank angle speed of an engine crank shaft, for judging the combustion condition of each of the cylinders based on variations thereof and for controlling the engine based on the judgment of the combustion conditions have been generally known. For example, Japanese Patent Un-examined Publication No. 3-15645 discloses a multiple cylinder engine control system provided with means for detecting the crank angle speed when each of pistons of the cylinders are positioned at the same stroke points respectively, obtaining crank angle speed data based on the detection, judging the combustion conditions of each of the cylinders and controlling a fuel injection amount and ignition timing and the like.

In the above system, if the crank angle speed data can be obtained with the same condition for the respective cylinders and the crank angle speed is detected based on the measurement of a relatively short term (about 20° crank angle), a crank angle speed variation can be readily detected even in an idle operation and low speed operation.

It should however be noted that although the respective crank angle detections are expected under the same conditions, the combustion condition of other cylinders would influence the measurement of the crank angle speed of the object cylinder depending on the selection of the portion of the crank angle for measurement so that a correlation between the combustion conditions and the crank angle speeds of each of the cylinders. Thus, the system disclosed in the above publication is disadvantageous that the judgment of the combustion conditions of the engine could not be properly detected based on the crank angle speed detection. There is a need for a system for judging combustion conditions of the cylinders properly.

In another aspect, there has been known an engine making a lean-burn operation in which the engine is operated with a leaner intake gas mixture of an air fuel ratio (also referred to as A/F) having a larger value than a theoretical value (14.7). In an engine making the lean-burn operation in an off-idling operating range (operating range other than an idling operating range), it is desirable that the engine combustion condition is accurately judged based on the measurement of the crank angle speed as to whether an combustion is properly being done under such a lean-burn operation. In particular, it is desirable that the combustion condition is properly judged based on the crank angle detection even in a relatively high speed and high load condition of the lean-burn operation range. In this respect, it would be difficult for the above system as disclosed in the Japanese publication 3-15645 to detect the crank angle speed with a satisfactory precision in the lean operation range due to a shorter range for crank angle measurement, and thus, due to a shorter time period for the measurement, particularly in a middle and high engine speed condition.

SUMMARY OF THE INVENTION

It is therefore an object of the present invention to provide a method for detecting the crank angle speed and judging the engine combustion condition based on the detection of the crank angle speed even in a relatively high engine speed condition.

It is another object of the present invention to provide an engine control system for reliably detecting the variation of the crank angle speed.

The above and other objects of the present invention can be accomplished by an engine combustion condition judging method for detecting a crank angle speed of a multiple cylinder engine to judge a combustion condition of each of cylinders of the engine based on the detection of the crank angle speed, wherein the improvement includes steps of;

setting a predetermined crank angle range selectively determined within a range between a crank angle at which a combustion substantially terminate in a given cylinder and another crank angle at which a combustion substantially start in the next cylinder for detecting a crank angle speed property, and judging the combustion condition based on said crank angle speed property within the predetermined crank angle range.

According to the above method, it is possible to make a proper judgment of the combustion condition based on the crank angle speed property detected within the predetermined crank angle range since a correlation between the combustion conditions in the cylinders and the crank angle property in the predetermined crank angle range selectively determined in a range between the crank angle at which a combustion is about to terminate in a given cylinder and the other crank angle at which a combustion is about start in the next cylinder in an engine cycle.

In this method, it is preferred that the predetermined crank angle range for detecting the crank angle speed property is determined in the second half of the expansion stroke, in particular, determined within 100° crank angle (referred to as ° CA) to 200° CA after top dead center of the second half of the expansion stroke (ATDC) and the predetermined range is set not smaller than 60° CA.

The correlation between the combustion conditions and the crank angle fluctuation is remarkable or distinctive in the range between the 100° CA and 200° CA in which the inertia torque is increased. In this range, such a relatively remarkable correlation therebetween can be obtained even in the engine high speed range. the predetermined crank angle range is set not smaller than 60° CA so that the a time period enough to effect the detection of the crank angle speed in the high engine speed can be obtained.

In the above method, if frequency components corresponding to an explosive rotation degree of an engine which is considered as a noise factor in obtaining the crank angle speed are excluded from the crank angle speed measured data, an influence of a resonance in the crank shaft rotation due to an explosive impact of an combustion can be effectively removed so that a reliability of the judgment of the combustion conditions in the cylinders are improved. It is recognized that the explosive rotation degree of the engine is frequency components which do not reflect the engine combustion condition in the cylinders.

In this case, the frequency components corresponding to the explosive rotation degree of the engine can be removed by obtaining a difference in the detected data of the crank angle speed between the current cycle and the precedent cycle to obtain the fluctuation of the crank angle speed.

The influence of the resonance tends to be increased in the high engine speed range so that the frequency components corresponding to the engine explosive rotation degree may be removed only in the high engine speed range.

If the frequency components lower than 0.5 degree of the engine rotation in the case where the crank angle speed property or crank angle speed change property is obtained based on data of the measurement of the crank angle or equivalent value thereof, influences due to the crank angle fluctuation resulting from imbalance of the wheels and power train and vibration acting on the tires transmitted from the road surface can be removed to improve the accuracy of the judgment of the combustion condition in the cylinder.

It is advantageous that the A/F is controlled based on the judgment of the combustion condition in a lean burn operation in which the A/F is controlled to a value greater than the theoretical value in a predetermined operating range of the engine. In this case, an A/F control gain is controlled based on the combustion condition.

According to the above method, the A/F is controlled lean or to have a greater value than the theoretical A/F in the lean burn operation while the combustion condition in the cylinder is maintained stable.

In another aspect, the present invention provides an engine control system making use of the above method, comprising crank angle speed detecting means for detecting a crank angle speed or equivalent thereto of an engine in a predetermined crank angle range selectively determined within a range between a crank angle at which a combustion is about to terminate in a given cylinder and another crank angle at which a combustion is about start in the next cylinder for detecting a crank angle speed property, combustion condition judging means for judging the combustion condition based on said crank angle speed property within the predetermined crank angle range and air fuel ratio control means for controlling an air fuel ratio of the engine in accordance with the judgment of the combustion condition judging means.

Preferably, the air fuel ratio control means comprises an air fuel control gain setting means for setting a target air fuel control gain which provides a greater air fuel ratio than a theoretical air fuel ratio in a predetermined lean burn operation range and an air fuel ratio control gain compensation means for compensating the air fuel control gain base on the judgement to the combustion condition judgement means.

The combustion condition judging means judges the combustion condition in the cylinder by comparing the crank angle speed change property with a first set value and a second set value lower than the first set value, the air fuel ratio compensation means compensates the air fuel ratio control gain to make an intake gas mixture rich when the crank angle speed fluctuation is greater than the first set value, and make the intake gas mixture lean when the crank angle speed fluctuation is smaller than the second set value.

Preferably, the crank angle speed detecting means detects the crank angle speed property or equivalent there to of the engine in the predetermined crank angle range selectively determined within the crank angle range between 100° CA and 200° CA after top dead center (ATDC) in the expansion stroke.

Further in preferred embodiment, the control system further comprises data processing means for removing frequency components corresponding to the engine explosive rotation degree and values frequency components corresponding to values lower than 0.5 degree of the engine rotation from the data obtained through the measurement.

Further objects, features and advantages of the present invention will become apparent from the Detailed Description of Preferred Embodiments which follows when read in light of the accompanying Figures.

BRIEF DESCRIPTION OF THE DRAWINGS

FIG. 15 is a graphical representation of a relationship between the ignition timing, roughness and Nox emission amount.

DETAILED DESCRIPTION OF THE PREFERRED EMBODIMENTS

Hereinafter, the present invention is described in detail taking reference with the attached drawings.

Figure 1:
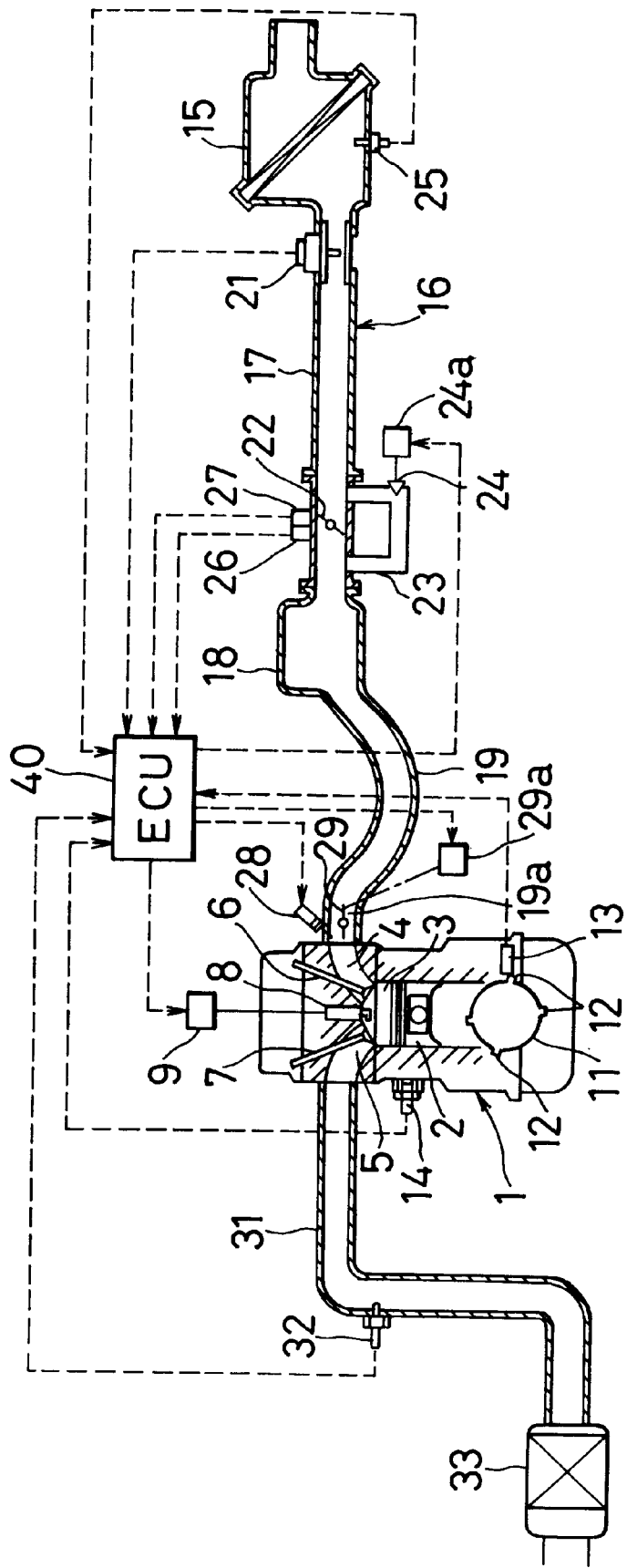
FIG. 1 is a schematic view of an engine which is provided with a control system in accordance with a preferred embodiment of the present invention.

FIG. 1 is a schematic view of an engine to which the present invention is applied. The engine is of a four cycle gasoline engine of a straight four cylinder which is provided with an engine body 1 and intake and exhaust systems therefor. Each cylinder of the engine body 1 is formed with a combustion chamber 3 above a piston 2. To the combustion chamber 3 are opened an intake port 4 and exhaust port 5 for which an intake valve 6 and exhaust valve 7 are provided. An ignition plug 8 is mounted on the engine body 1 to be oriented into the combustion chamber 8. The ignition plug 8 is connected to an ignition circuit 9 including an ignitor capable of electronic control of ignition timings.

At an end of a crank shaft of the engine body 1 are mounted a detection plate 11 with a predetermined number of projections 12 at a peripheral portion thereof. A crank angle sensor 13 comprising an electromagnetic pickup or the like is disposed corresponding to the peripheral portions of the plate 11. As the plate 11 rotates along with the crank shaft during the engine operation, a pulse signal is produced when the projection 12 passes through the crank angle sensor 13. The engine body 1 is provided with a coolant temperature sensor 14. The intake system of the engine is provided with an intake passage 16 for introducing an intake air from an air cleaner 15 to the engine body 1. The intake passage is formed a common intake passage 17, a surge tank 18 disposed downstream thereof and individual intake passages 19 from the surge tank 18 to the intake ports 4 of the cylinders respectively. In the common intake passage 17 are disposed an air flow meter 21, a throttle valve 22, Idling Speed Control(ISC) passage 23 bypassing the throttle valve 22 and ISC valve 24 for opening and closing the ISC passage. In addition, there are provided in the intake system, an intake gas temperature sensor 25, idle switch 26 for detecting an entire close condition and a throttle opening sensor 27 for detecting the throttle opening.

In the vicinity of a downstream end of the individual passages 19 are mounted injectors for injecting a fuel. The injector 28 opens for a time period corresponding to a pulse width based on a signal (injection pulse) from Electronic Control Unit (ECU) 40 to inject the fuel supplied by an oil pump (not shown) through an oil passage to the intake port 4. In order to improve the combustibity during the lean burn operation, it is preferred that the individual passage are divided into a primary passage (not shown) and a secondary passage 19a in the downstream thereof both which are opened to the port 4 and that a swirl control valve 29 is provided in the secondary passage 19a to be closed in the lean burn operation and the like to produce a swirl of the intake gas in the combustion chamber 3.

The exhaust system of the engine is provided with an exhaust passages 31 led to the exhaust ports 5 of each of the cylinders. In the exhaust passage 31 are provided a $\lambda$O2 oxygen sensor 32 and catalytic converter 33 for cleaning the exhaust gas. The $\lambda$O2 sensor detects Oxygen concentration (O2 concentration) output in the exhaust gas to obtain the A/F of the intake gas introduced to the combustion chamber 3 wherein the output of the O2 sensor is remarkably changed when the theoretical A/F is detected. The catalytic converter 33 may clean the emission such as Nox in the exhaust gas, preferably, could be effective even in the lean burn operating condition in which the A/F takes continuously a value such as more than 22 greater than the theoretical value, in other words, leaner intake gas mixture is continuously introduced to the combustion chamber 3.

Figure 2:
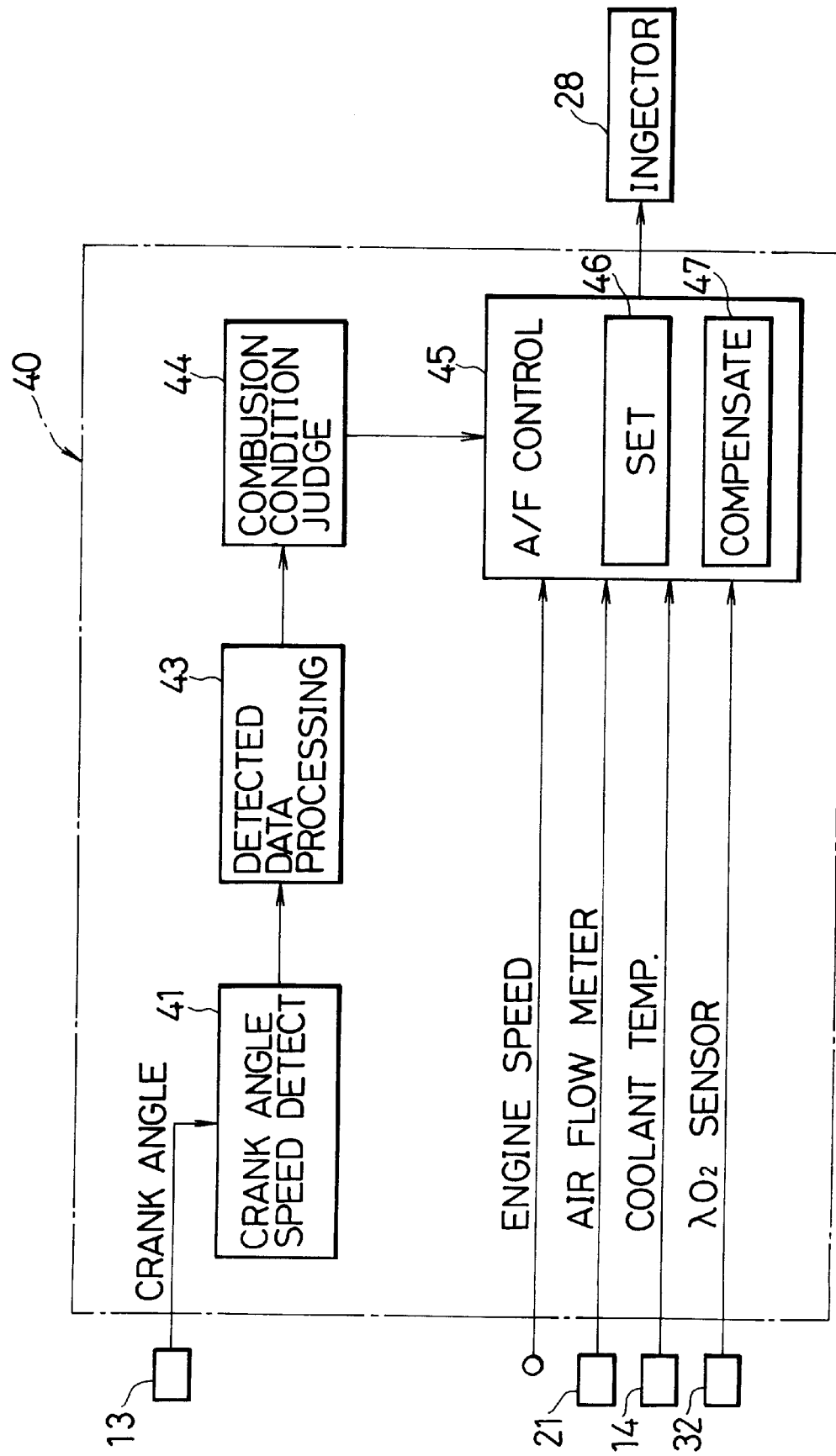
FIG. 2 is a block diagram of a control unit.
Figure 3:
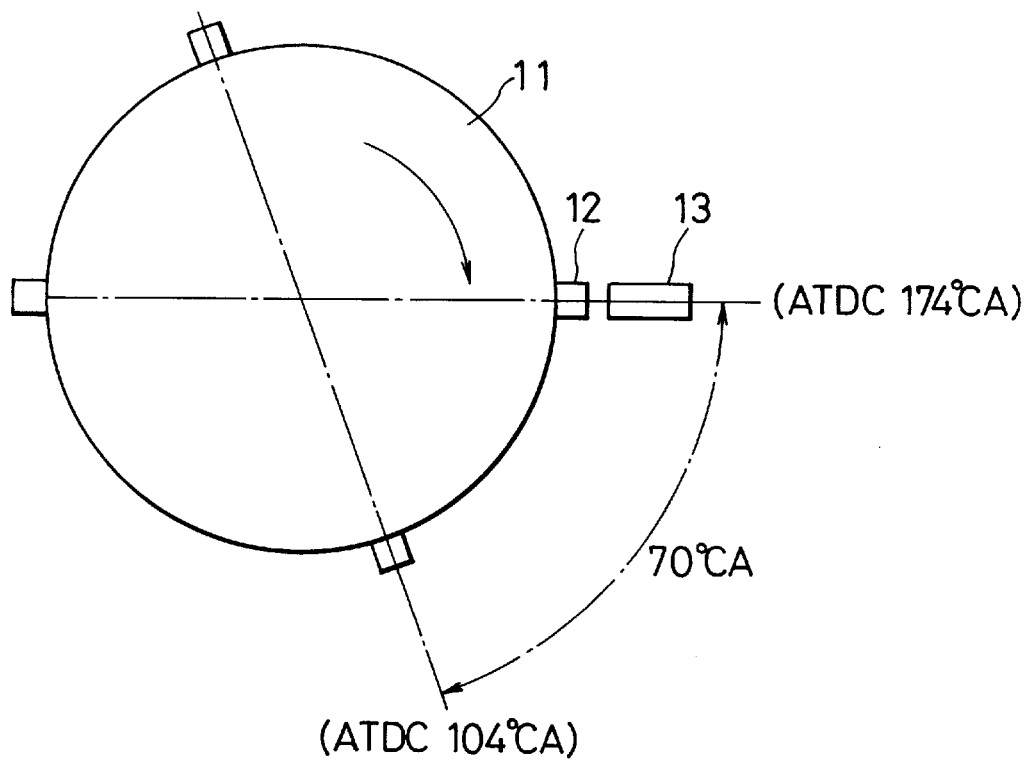
FIG. 3 is a view showing a detection plate for a crank angle and crank angle sensor.

Numeral 40 is an Electronic Control Unit (ECU) for an engine control which is comprised of a microcomputer and the like. To the ECU 40 are introduced signals from the crank angle sensor 13, coolant temperature sensor 14, air flow meter 21, intake gas temperature sensor 25, idle switch 26, throttle opening sensor 27, 102 sensor 32 and the like. The ECU 40 produces signals for controlling the injector 28 for the fuel injection, the ignition circuit 9 for the ignition timing, as well as signals to an actuator 24a of the ISC valve 24 and actuator 29a of the swirl control valve 29. The ECU 40, as shown in FIG. 2, is provided with a crank angle speed property detecting element 41, measured data processing element 43, judging element t 44 and A/F control element 45. The crank angle speed property detecting means detects a crank angle speed due to an engine operation based on signals from the crank angle sensor 13, in particular, based on intervals of the signals from the sensor 13. Preferably, the detection of the crank angle speed is carried out within a predetermined crank angle range selectively determined between a crank angle at which a combustion is about to terminate in a cylinder and another crank angle at which a combustion is about to start in the next cylinder of an engine cycle (preferably, during the second half of the expansion stroke).

In a preferred embodiment, the crank angle detection points are provided so that the predetermined crank angle range for detecting the crank angle speed property is determined to have a crank angle range not smaller than 60° CA within a range of 100–200° CA in the expansion stroke. For example, arrangements of the projections 12 in the plate 11 and the crank angle sensor 13 are so determined as to detect the crank angle of ATDC 104° CA and ATDC 174° CA (6° before top dead center (BTDC)). The crank angle speed $\omega$ for 70° CA in the detection points set covering the above range of ATDC 104° CA and ATDC 174° CA is calculated.

The measured data processing element 43 calculates the crank angle fluctuation from the crank angle data measured by the crank angle speed detecting element 41. In this case, certain frequency components having 0.5 degree of the engine rotation, those having natural number times thereof and the frequency components having degrees lower than 0.5 degree of the engine rotation is removed from the crank angle data obtained in order to remove possible noise factors of the judgment of the combustion condition.

The combustion judging element 44 judges whether or not the combustion conditions in the cylinders are stable base on the crank angle speed fluctuation profile.

The A/F control element 45 adjusts the fuel injection amounts from the injectors 28 based on the outputs of the air flow meter 21, engine speed, coolant (water) temperature, $\lambda$O2 sensor 32 to control the A/F. The A/F control element 45 includes an air fuel control gain setting element 46 for setting a target air fuel control gain which provides a greater air fuel ratio than a theoretical air fuel ratio in a predetermined lean burn operation range and an air fuel ratio control gain compensation element 47 for compensating the air fuel control gain base on the judgement to the combustion condition judgement element 44 to thereby execute the lean burn operation in the predetermined range.

Figure 4:
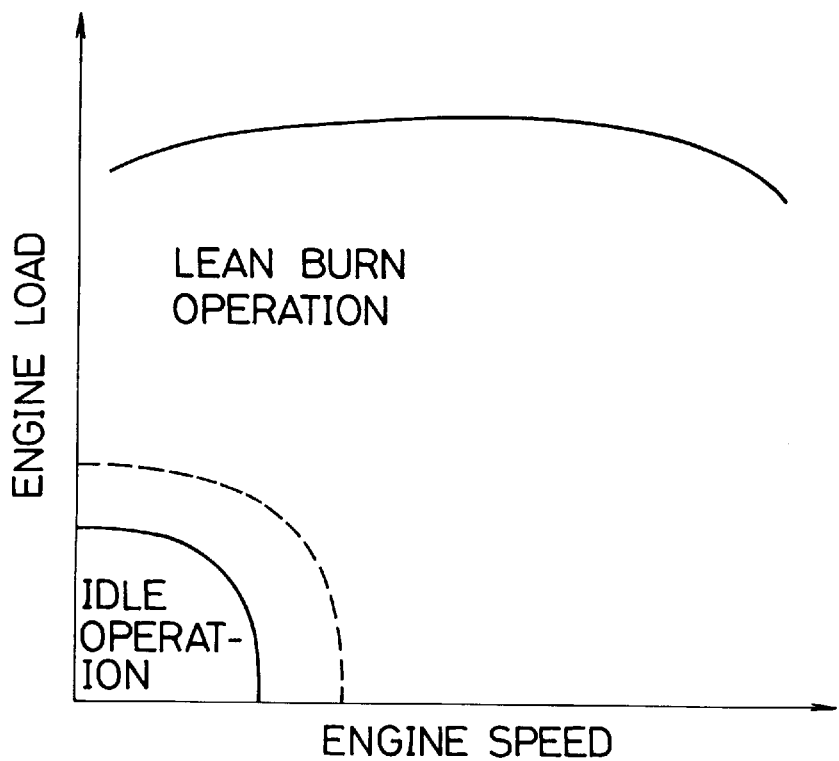
FIG. 4 is a map showing areas set for A/F control.

The lean burn operation range is defined as shown in FIG. 4 as a predetermined operation area excluding an idling operation area (for example, all the operation area other than the idling operation area). After an engine warm up operation in the lean burn operation range, a base fuel injection amount (A/F control gain) is set based on the intake air amount to accomplish a predetermined target A/F and the base fuel injection amount is compensated based on the judgement of the combustion conditions in the cylinders to control the A/F to a lean burn limit .

Hereinafter, the preferred embodiment of the present invention is explained.

Figure 5:
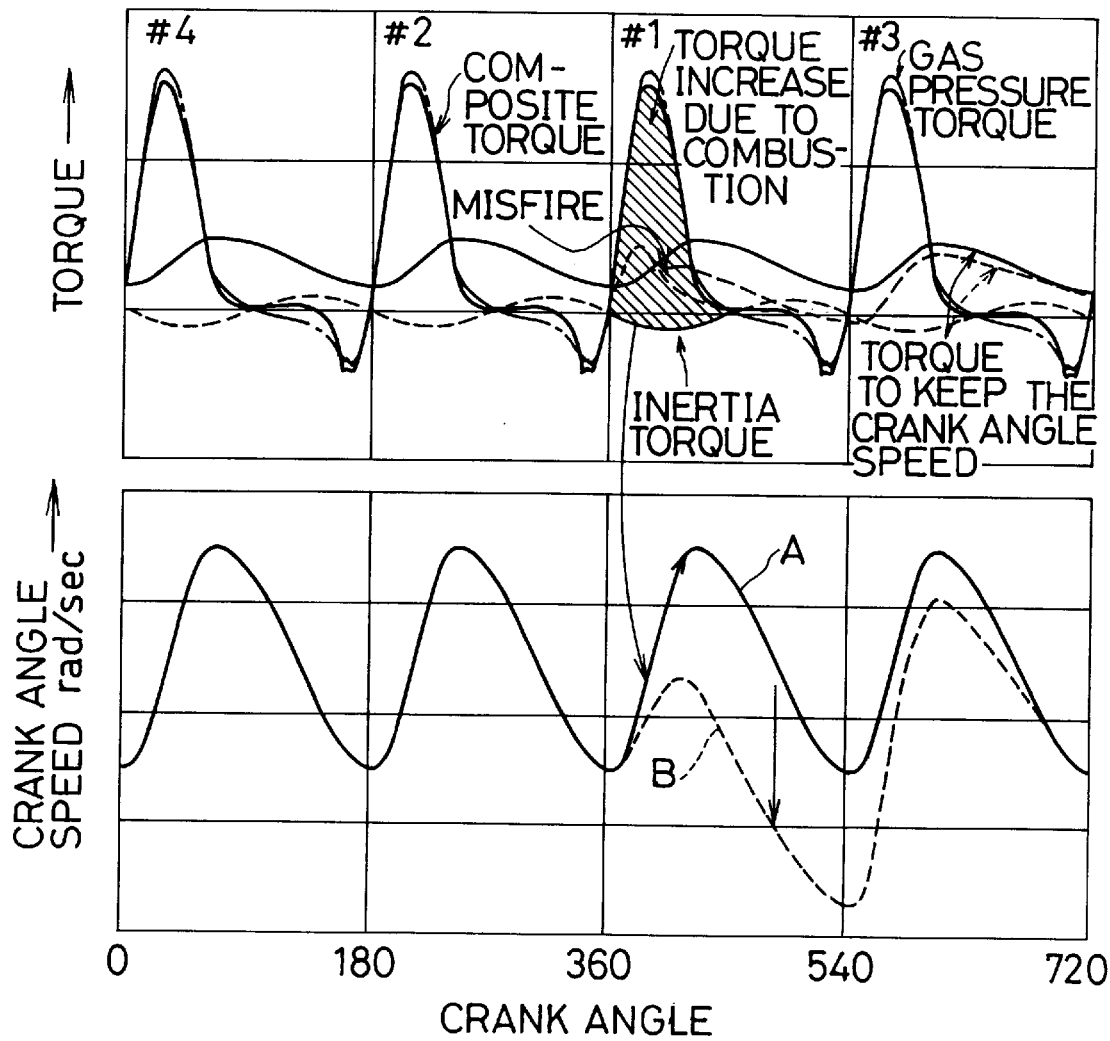
FIG. 5 is an illustrative view showing changes of four cylinder 4 cycle engine stroke, torque, and crank angle speed.

FIG. 5 shows that changes of engine output torque and the crank angle speed $\omega$ with a crank angle in the abscissas in a straight four cylinder four cycle gasoline engine. As illustrated, the combustion occurs in No. 4, No.2, No. 1 and No. 3 cylinders in this order. Due to the combustion, a gas pressure torque (double dot chain line) changes and due to piston stroke, inertia torque changes. A composite torque of gas pressure torque and inertia torque change as shown by a thick real line in normal combustion. The crank angle speed changes as shown by a real line A in the normal combustion in which the crank angle speed increases as a combustion pressure increases after the ignition and then decreases as the combustion is completed. On the other hand, when an ignition failure or a misfire occurs in No. 1 cylinder, the crank angle speed changes as shown by a broke line B in which the crank angle speed remarkably decreases in the middle of expansion stroke as the combustion pressure is reduced so that the difference of the crank angle speed between the normal combustion and the misfire is increased.

Namely, in the normal combustion, the crank angle speed is increased as the combustion pressure is increased in the cylinder after ignition and the crank angle speed is reduced upon terminating the combustion. On the other hand, in the case of misfire, the increase of the crank angle speed in the combustion or expansion stroke is small. It should however be noted that the crank angle speed is relatively low in the first half of the combustion stroke even in the normal combustion, and therefore, the difference between the normal combustion and misfire is not so distinct in the first half of the combustion stroke. In the second half of the stroke, the crank angle speed reduction of the low combustion pressure due to the misfire is distinct and the difference in the crank angle speed property between the normal combustion and the misfire is increased. In the next cylinder (No.3) which is supposed to make a combustion following the current cylinder misfired, the crank angle speed is still slow in the first half of the expansion stroke due to the influence of the misfire of the precedent cylinder (No.2). However, the crank angle speed recovers toward a normal value as the stroke is advanced.

Figure 6:
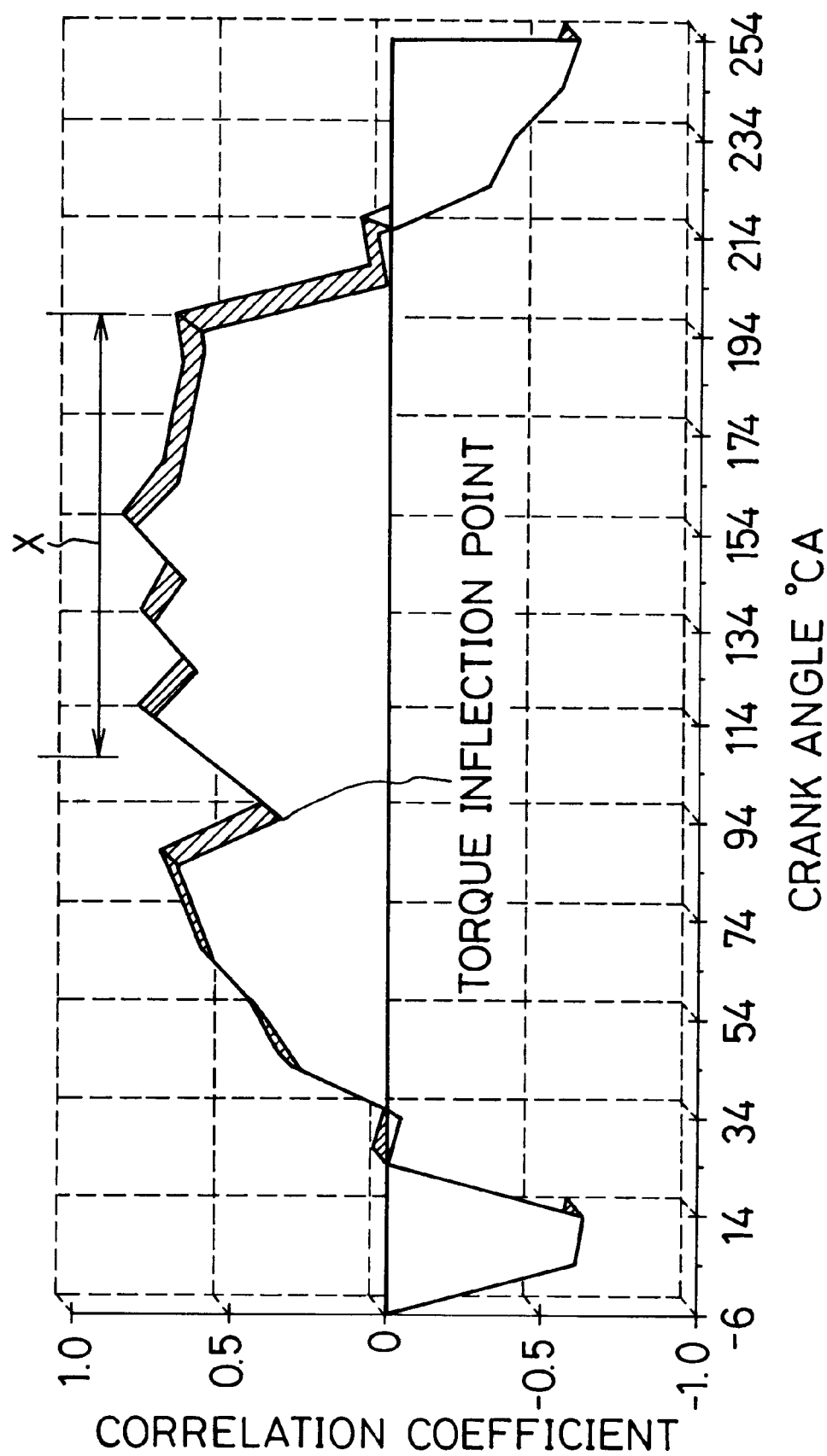
FIG. 6 is an illustrative view showing between a combustion pressure and crank angle change profile.

FIG. 6 shows a relationship between the combustion pressure and the change in the crank angle speed wherein the abscissas shows the crank angle speed ω with the compression stroke top dead center being 0° in a cylinder and the ordinates is a correlation coefficient. The correlation coefficient is defined as a degree of influence of the combustion condition (combustion pressure) to the crank angle speed. If the value of the correlation coefficient is positive, the correlation between the combustion pressure profile and the crank angle speed profile is distinct or remarkable in a specific cylinder. If this value is negative, this means that the combustion pressure profile in the precedent cylinder greatly influences the crank angle speed profile compared with the current cylinder.

As seen from FIGS. 5 and 6, the crank angle speed is dominated by the combustion condition by the precedent cylinder combusted just before the current cylinder until the main combustion period (about TDC-ATDC 20° CA) and a delay time period (about 20° CA) has passed. The delay time period is defined aa the time period between the time when the combustion occurs in the cylinder and the time when the torque increase due to the combustion is reflected in the crank angle speed. The time when the main combustion period and the delay time period have passed corresponds generally to the time when the combustion substantially ends in the cylinder. A distinct correlation of the combustion pressure change profile and the crank angle speed change profile can be obtained between the time of the substantial end of the combustion and a time when the combustion substantially starts in the next cylinder in the engine cycle.

In view of this, the crank angle speed change profile is substantially obtained in the crank angle range from a substantial end of the combustion (about ATDC 40° CA) in the current cylinder to a substantial start of the combustion in the next cylinder (about ATDC 200° CA). Specifically, after the reduction of the gas pressure torque and the experience of torque inflection point (about ATDC 90° CA), the correlation coefficient becomes remarkable in a period X (ATDC 100° CA to ATDC 200° CA) wherein the inertia torque is increased. This is remarkable in the high engine speed range in which the inertia torque is increased.

Therefore, if the crank angle speed is detected during the period of ATDC 40° CA to ATDC 200° CA, in particular, during the period of ATDC 100° CA to ATDC 200° CA, the judgment of the combustion condition could be reliable. In this embodiment, the combustion condition is judged during the lean burn operation in which the A/F is controlled to a value greater than the theoretical A/F, specifically in the middle and high engine speed conditions. In this case, the reliability of the judgment of the combustion condition can be improved by measuring the crank angle speed within a range X in FIG. 6. Particularly, it is preferred that the crank angle detection span is greater than 60° CA so as to keep a sufficient detecting period for the crank angle (obtaining signals from the crank angle sensor) even in middle and high engine speed conditions.

Based on the above, the crank angle speed is calculated based on the measurement of intervals of the signals from the crank angle sensor 13. The crank angle speed change profile is obtained based on the detected data of the crank angle speed. In this case, noise signals against the accurate judgment of the combustion conditions in the cylinders are removed from the detected data by means of the detected data processing element 43.

Figure 7:
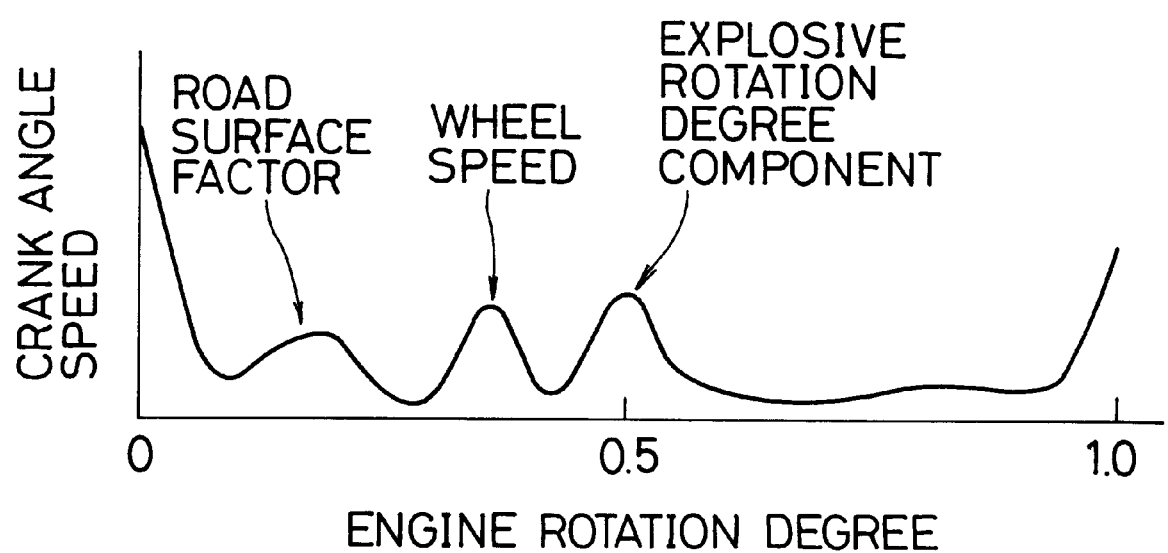
FIG. 7 is a view showing a crank angle speed fluctuation due to noise factor.

As noise factors producing a crank angle speed fluctuation other than the change in the combustion condition, there are crank angle speed variations based on an influence of resonance due to the explosive combustion as a vibration source, wheel rotation due to imbalance of wheel and drive system thereof, vibration acting from a road surface to a tire and the like. As shown in FIG. 7, the noise of the explosive rotation degree component due to the influence of the resonance is produced in frequency components having 0.5 degree of the engine rotation speed and by times of natural number thereof. In the four cycle engine, one cycle of the engine output torque change corresponds to two rotations of the crank shaft. where the torque change of the crank shaft is expressed with Fourier series, the first term of the harmonic series is 0.5 degree, followed by 1 degree, 1.5 degree and the like as second and third terms and the like (wherein a harmonic term having one cycle for one crank shaft rotation is one degree). This is because the four cycle engine have one cycle for two crank shaft rotation. The noises due to the influence of the wheel rotation imbalance and due to the influence of road surface are produced in a cycle lower than 0.5 degree of the engine rotation.

Figure 8:
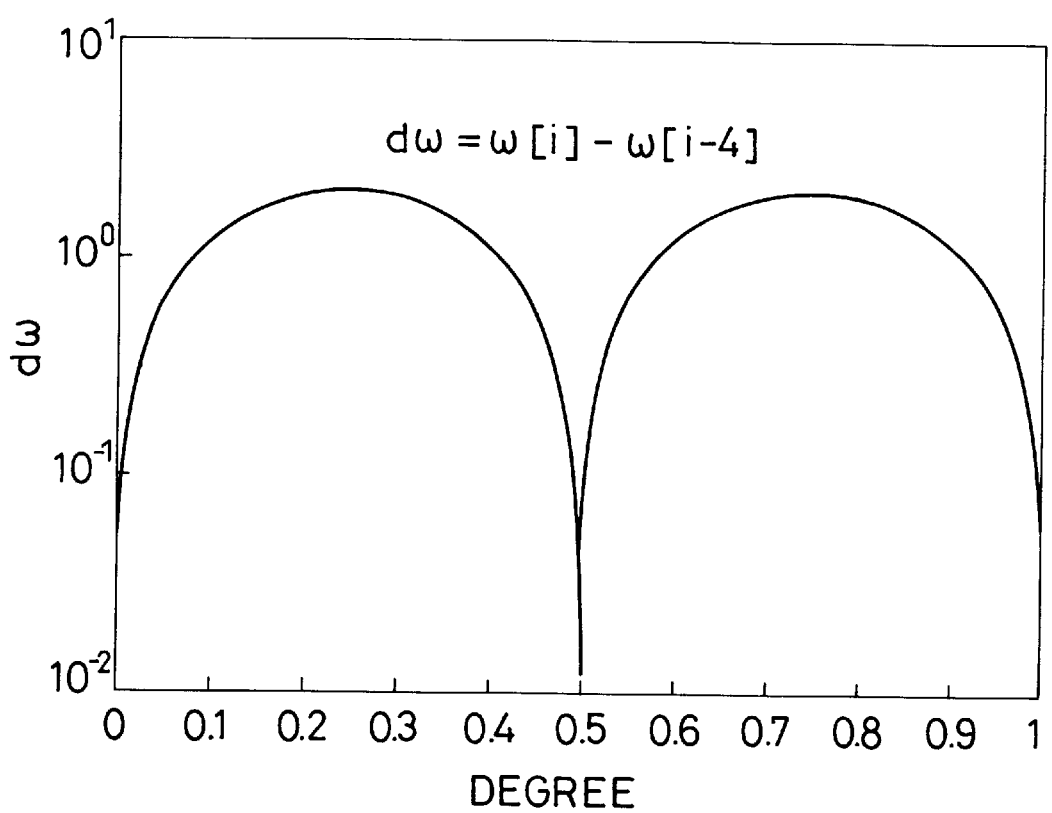
FIG. 8 is a view showing data after removing frequency components of 0.5 of the engine rotation and those having natural number times thereof from the crank angle detected data.

In view of this, the detected data processing element 43 excludes the frequency components of 0.5 degree and times of natural number thereof of engine rotation speed for noise processing. Specifically, the deviation of the crank angle speed of the current cycle and the precedent cycle is obtained, Namely, the deviation dω[i] of the crank angle speed between the current detected value ω[i] of the crank angle speed and the four time precedent value ω[i−4] in the four time precedent cycle of the crank angle speed with regard to the same cylinder is calculated. As a result, the frequency components of 0.5 degree of the engine rotation and natural number times thereof is excluded from the crank angle data detected, as shown in FIG. 8.

For example, the crank angle speed change can be obtained by the following formula.

$$d\omega=(\omega[i-2]+\omega[i])/3-\omega[i-1]$$

Wherein ω[i], ω[i−1], ω[i−2] are crank angle speeds in the current, precedent and two time precedent detected values respectively. Alternatively, the frequency components of 0.5 degree and those of natural number times of the engine rotation can be removed by obtaining the deviation of the crank angle speed change do between the current value and the previous value.

Figure 9:
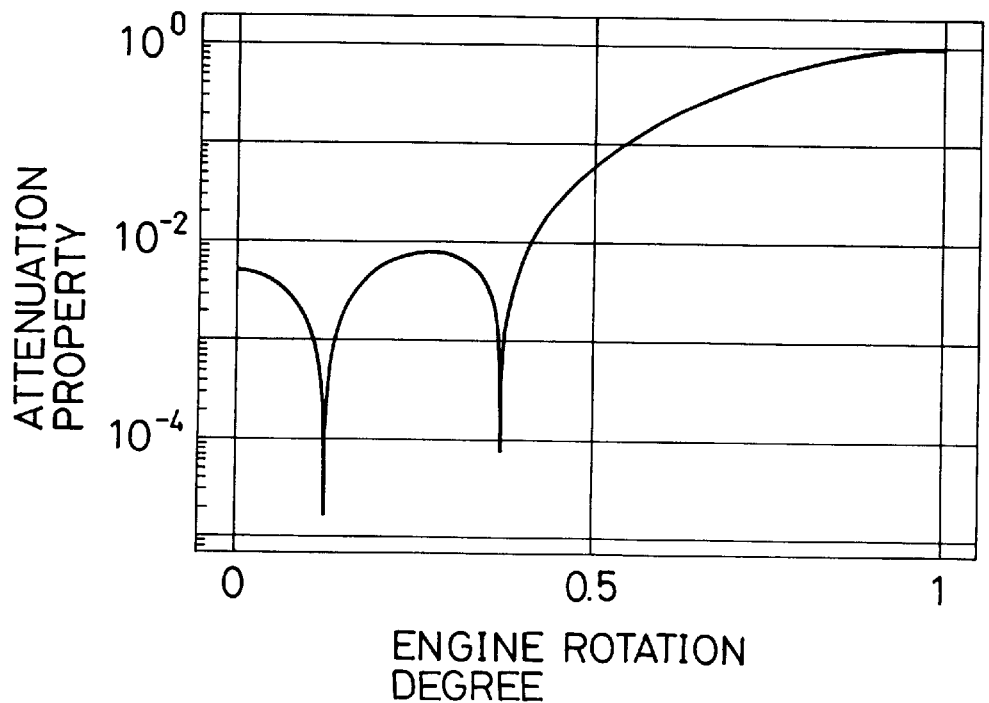
FIG. 9 is a view showing data after removing frequency components having degrees lower than 0.5 degree of the engine rotation using a high-pass filter.

In addition, the detected data is processed by a high-pass filter (For example, FIR type rotation synchronous digital filter) to reduce the noise components having degrees lower than 0.5 degree of the engine rotation sufficiently as shown in FIG. 9.

The combustion condition is judged based on the crank angle speed change data by means of the judging element 44. The fuel injection amounts from the injectors 28 are controlled based on the judgement of the combustion condition by means of the A/F control element 45 of control the A/F. The judgment of the combustion condition and control for the A/F are executed during the lean-burn operation so as to control the A/F to the lean burn limit while maintaining a stable combustion in the cylinder.

Figure 10:
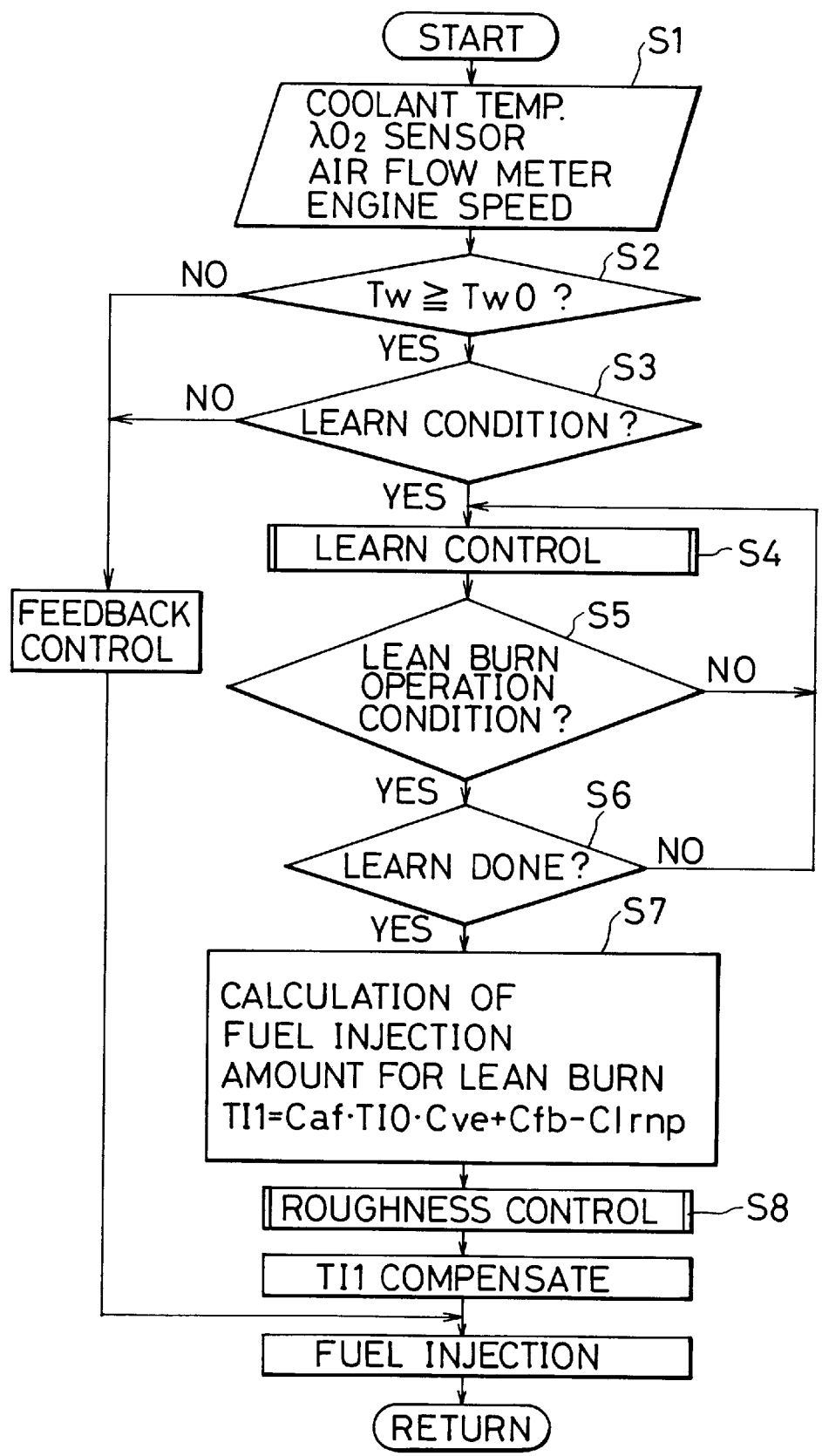
FIG. 10 is a flow chart of a main routine.
Figure 11:
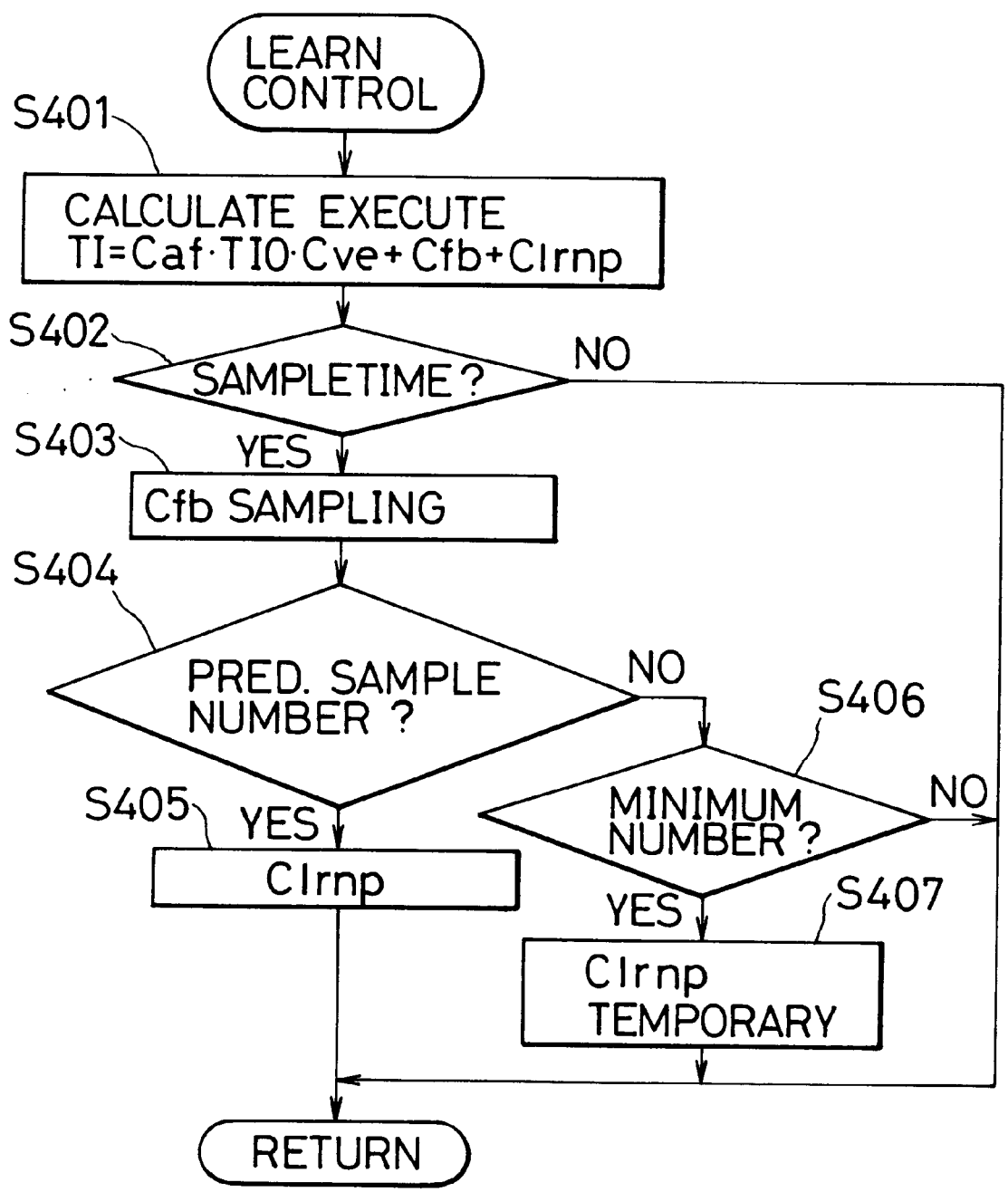
FIG. 11 is a flow chart of a routine showing a learning control.
Figure 12:
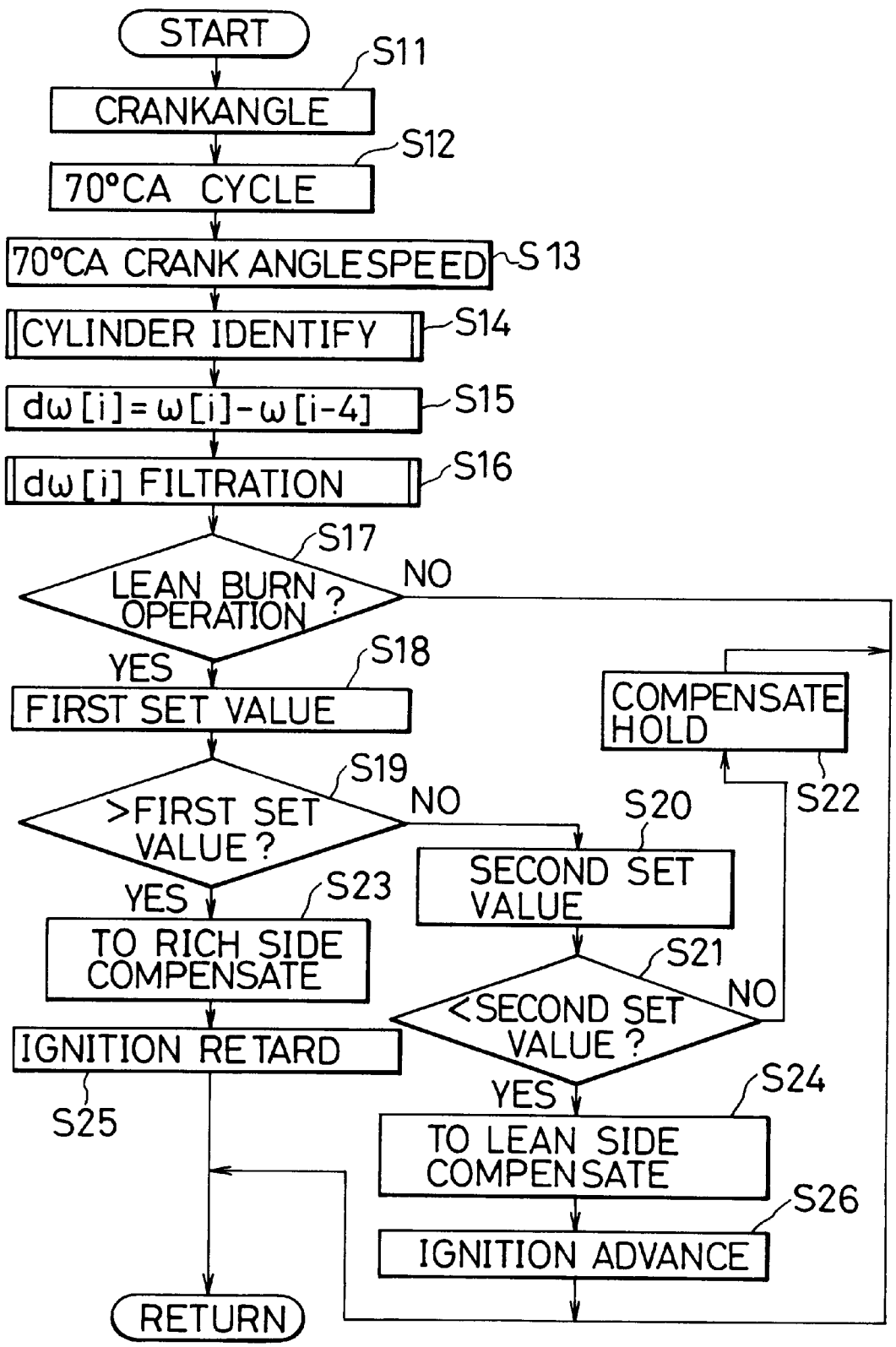
FIG. 12 is a flow chart of a routine showing a roughness control.

In FIGS. 10–12, there is shown an A/F control by means of the A/F control element. In this embodiment, without linear O2 sensor which is expensive, only $\lambda$O2 senor 32 which is relatively inexpensive is employed for detecting A/F. Where an engine temperature is lower than a predetermined value and where the engine operating condition is in the idling operation, the A/F feedback control is executed based on the output of the $\lambda$O2 senor 32 so as to control the A/F value to the theoretical value. In the warmed up condition where the engine temperature is higher than the predetermined value in the lean burn operation range, an open loop control is basically executed to accomplish a predetermined lean A/F value which has a greater than the theoretical A/F.

Hereinafter, the A/F control in accordance with the present invention will be explained in detail.

A main routine shown in FIG. 10 starts with, at first, reading the engine coolant temperature, $\lambda$O2 sensor output, air flow meter output, engine speed and the like (step S1). Next, it is judged whether or not the engine coolant temperature Tw is higher than a reference Tw0 (for example, 50° C.) denoting the semi-warmed up condition (step S2). When the engine coolant temperature Tw is higher than the reference Tw0, the feedback control for A/F is executed. Next, it is judged whether or not the conditions for the learning of the fuel injection are established (step S3). For example, where the engine operating condition is other than the idling operation area and where the A/F feedback control based on the output of $\lambda$O2 sensor is ready to be carried out, it is judged that the learning conditions are met and then the procedure is transferred step S4 to carry out the learning control.

In the learning control, as shown in FIG. 5, the fuel injection amount TI is calculated in accordance with the following formula.

$$TI = Caf^* TI0^* Cve + Cfb + Clrnp$$

wherein TI0 is a base fuel injection amount based on the operating condition, for example, obtained from the intake air amount and engine speed;

Caf is an A/F compensation coefficient (in this embodiment, Caf=I corresponding to the theoretical A/F);

Cve is a volumetric efficiency compensation coefficient (described in detail later);

Cfb is a feedback compensation value corresponding to the $\lambda$O2 sensor output;

and Clrnp is a learned compensation value (where the learning control has not been done, the value of Clrnp=0). The fuel injection is done with the calculated value TI (step S401). In FIG. 11, the feedback compensation value Cfb is sampled at a predetermined sampling time (step S402, S403). Where the sampling number reaches the predetermined number, for example 16, the value of Clrnp is calculated from a mean value of the sampled values of the feedback compensation values Cfb to be stored in a memory (step S404 and S405). In this case, where the sampled number exceeds a minimum effective number (for example 4) smaller than the predetermined sampling number, a temporary leaned compensation value Clrnp may be calculated (step S406, S407).

Figure 14:
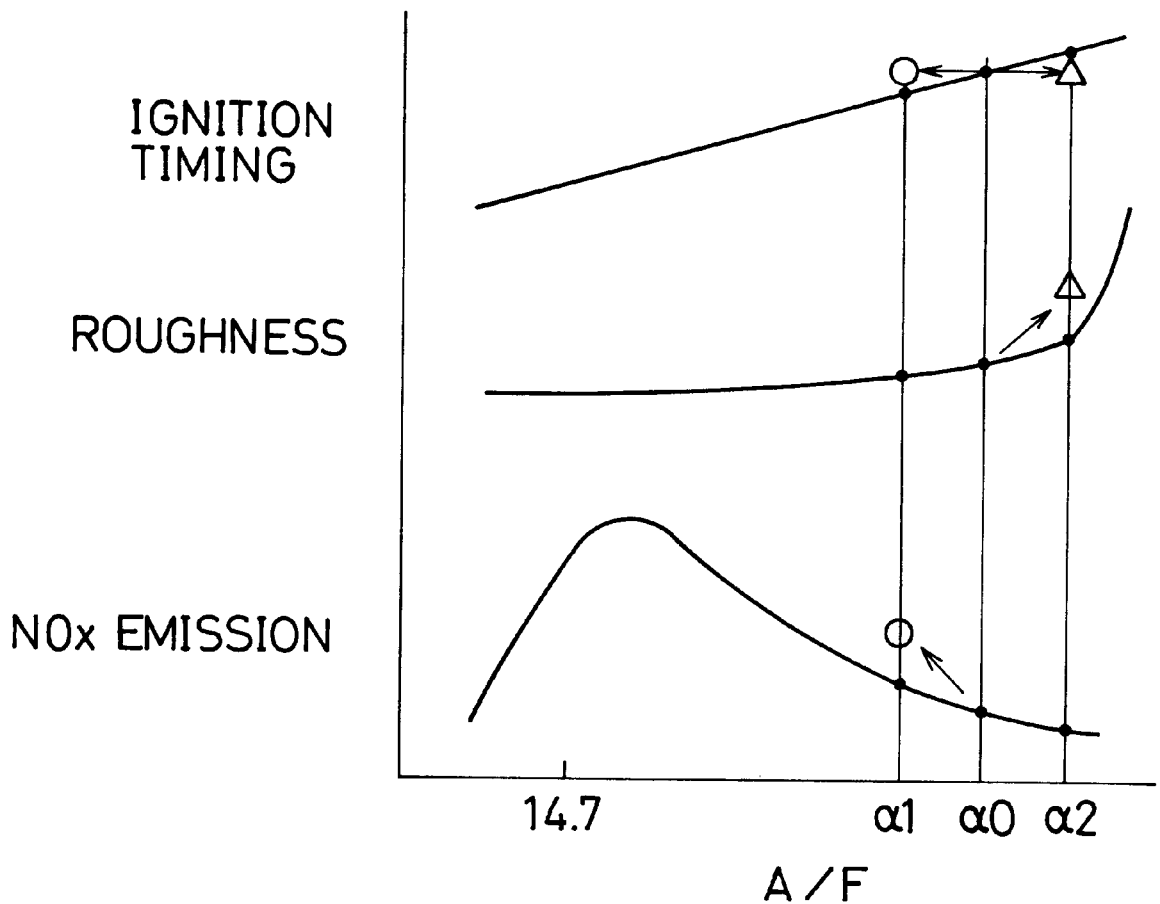
FIG. 14 is a characteristic view showing an influence of a coolant temperature to a learned value.

In this manner, the learning control is carried out before the engine reaches the warmed up condition. In this case, the coolant temperature affects the learning compensation value Clrnp. For example, where the coolant temperature is extremely low as shown in FIG. 14, the learned compensation values are greatly deviated from the ones obtained under the warmed up condition or substantially warmed up condition where the coolant temperature is close enough to the warmed up condition. As a result, the learned compensation value is not reliable in the case of undue low coolant temperature condition. In view of this, the learning control will not be carried out where the coolant temperature Tw is lower than the reference value Tw0 or where the engine operating condition has not reached the semi-warmed up condition yet. Preferably, the learned compensation value Clrnp may be compensated based on the dependency of the coolant temperature as shown in FIG. 14 during the learning control.

In FIG. 11, in step S5, it is judged whether or not the lean burn operating conditions are met. In this judgment, for example, it is judged that the lean burn operating conditions are met where the coolant temperature is higher than a predetermined temperature, for example 60° C. and where the operating condition is in the lean burn operating area. Where the lean burn operating conditions are met in step S5, it is judged whether or not the learning control has been done by judging whether or not at least the temporary learned compensation value Clrnp is obtained through the learning control in step S6 (S407 in FIG. 11). Where either the judgment in step S5 or in step S6 is No, the procedure is returned to the step S4. On the other hand, where both the judgments in step S5 and S6 are Yes, the fuel injection amount TI1 as a preferred embodiment of the A/F control gain is calculated to accomplish a predetermined A/F or target A/F which provides a leaner intake gas mixture than that under the theoretical A/F by the following formula and executed at a predetermined timing (step S7).

$$TI1 = Caf^* TI0^* Cve + Cfb + Clrnp$$

wherein Caf is smaller than 1 for a predetermined leaner intake gas mixture of A/F;

Cfb is 0;

and Clrnp is a value which is learned compensation value obtained through the learning control(step S4) and stored in the memory. Thus, the learned value Clrnp is used for the calculation of a control gain of the fuel injection amount during the lean burn operation so that the A/F control in the lean burn operation is carried out not based on the output of linear O2 sensor and the variations of the fuel injection amount depending on the respective injectors are compensated based on the result of the learning control to accomplish an appropriate fuel injection control.

In the above formula, the volumetric compensation coefficient Cve is used for compensate the deviation of a true volumetric efficiency from a gross volumetric efficiency based on the output of the air flow meter, namely the difference between the value calculated based on the output of the air flow meter and an actual amount of the intake air introduced to the engine. The difference between the calculated value and the true value of the intake air amount relates to the engine property and changes depending on the operating area. Thus, the volumetric compensation coefficient Cve are predetermined based on experimental data for every operating condition and stored in the memory as a map configuration. The specific value of the volumetric compensation coefficient Cve is determined in light of the map depending on the operating condition.

The compensation based on the coefficient Cve in accordance with the operating condition is made where the fuel injection amount is calculated during the learning control. Thus, an error due to the change of the operating condition in the fuel injection amount is compensated by the volumetric compensation coefficient so that the learned compensation value is not substantially changed depending on the operating condition. Accordingly, it is not necessary to calculate the learning compensation value as the operating condition changes. As a result, the learned compensation value obtained in a certain operating condition can be used effectively in calculating the fuel injection amount in the lean burn operation even though it has been obtained through the learning control other than the lean burn operation.

Next, in step S8, the roughness control is carried out, specifically, the roughness control is executed in accordance with the procedure as shown in FIG. 12.

In FIG. 12, the crank angle signal from the crank angle sensor is introduced (step S11). A period or cycle of the crank shaft rotation is calculated based on the periodical detection of the crank angle signals(step S12) and the angular speed ω of the crank shaft is calculated (step S13).

Following the step S13 of detection of the crank angle speed ω, the determination of the cylinders are made(step S14). Thereafter, the procedure following the step S15 is executed for each of the cylinders. For each of the cylinders, the change in the crank angle speed ω is obtained by excluding noise from the above crank angle data.

In view of this, certain frequency components having 0.5 degree of the engine rotation speed and times of natural number thereof is removed from the crank angle data obtained and the crank angle speed change profile is obtained. specifically, the deviation dω[i] of the crank angle speed between the current value ω[i] and the previous value ω[i−4] in the precedent cycle with regard to the same cylinder is calculated (step S15). Then, lower frequency components are removed from the deviation dω[i] through the high-pass filter processing (step S16). Through the process of the steps S15, S16, the crank angle speed data excluding the frequency components of 0.5 degree of the engine rotation speed, natural number times thereof and lower than 0.5 degree of the engine rotation speed can be obtained.

Following the step S16 of FIG. 12, it is judged whether or not the operation area is in the lean burn operating range (step S17). Where the operating range is in the lean burn operating range, the A/F control is made based on the roughness (the crank angle speed variation) in steps S18 through S21. Namely, a first set value denoting a roughness limit is determined and it is judged whether or not the roughness exceeds the first set value (steps S18, S19). If the roughness is not greater than the first set value, a second set value smaller than the first set value by a certain value is determined and it is judged whether or not the roughness is smaller than the second set value (steps S20, and S21). The above first and second set values are stored in a map in connection with the operating condition. If the roughness is in a dead zone between the first and second set values, the fuel injection compensation value in accordance with the roughness is held (step S22). On the other hand, if the roughness exceeds the first set value, the fuel injection amount(TI1) is compensated to make the intake gas mixture rich by a predetermined value (fuel injection increase) (step S23). On the other hand, if the roughness is smaller than the second set value, the fuel injection amount (TI1) is compensated to make the intake gas mixture lean by a predetermined value (fuel injection reduction) (step S24).

Figure 13:
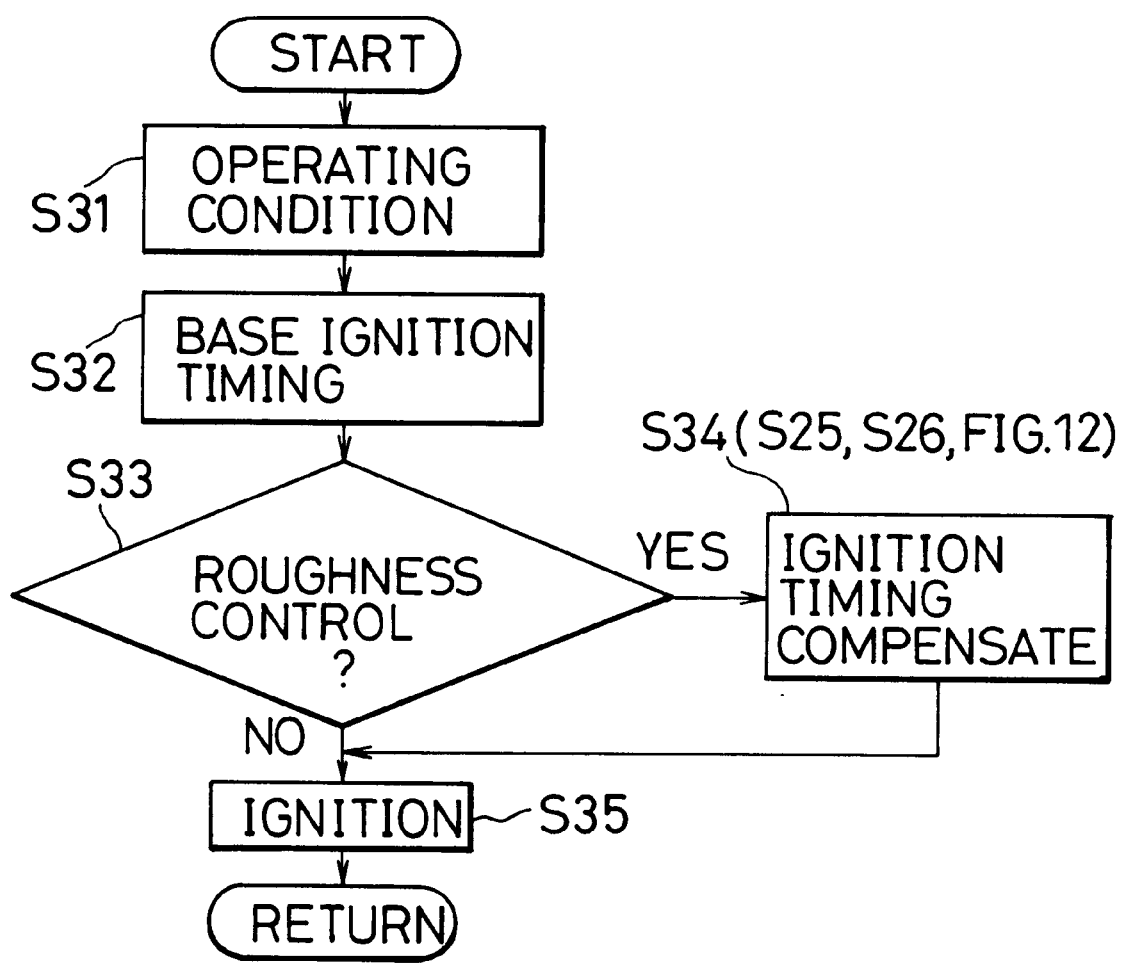
FIG. 13, is a flow chart of a routine for an ignition timing control.

The ECU executes a subroutine as shown in FIG. 13 at a predetermined interval, for example, for every predetermined crank angle. In this procedure, the operating condition is detected(step S31). The base ignition timing is determined in accordance with the target or predetermined A/F which is determined based on the engine operating condition(step S32). For example, the base ignition timing TI0 has a different value between the engine operation with the theoretical A/F and with the leaner intake gas mixture than that under the theoretical A/F. It is judged whether or not the roughness control has been done (step S33). The ignition timing is compensated corresponding to the A/F compensation in accordance with the procedures as shown in the steps S25 and S26 of FIG. 6 when roughness control has been done(step S34). Then, the ignition is executed (step S35). In this case, where the fuel injection amount is compensated to make the intake gas mixture rich, the ignition timing is retarded (step S25). Where the fuel injection is compensated to make the intake gas mixture lean, the ignition timing is advanced (step S26).

According to the control system in accordance with the present invention, in the lean burn operating condition after the warm up operation, the fuel injection amount is calculated for a predetermined lean intake gas mixture of A/F close to the stable combustion limit. In this case, the learned compensation value Clrnp obtained through the learning control (step S4 in FIG. 10). The volumetric compensation coefficient Cve is also introduced for compensation so as to calculate properly the fuel injection amount for the lean intake gas mixture of the A/F (target A/F).

A certain situation would occur that the combustion is unstable as result the engine operation is beyond the stable combustion limit even though the engine is operated with the predetermined lean intake gas mixture of A/F. In this situation, according to the present invention, the fuel injection amount(step S23 and S24) as well as the ignition timing (step S25 and S26) are compensated corresponding to the roughness of the combustion stability.

Namely, as shown in FIG. 12, where the roughness is greater than the first set value, the fuel injection amount is compensated to make the intake gas mixture rich to improve the combustion stability until the roughness is reduced smaller than the first set value. Concurrently, the ignition timing is retarded in accordance with the compensation of the fuel injection amount. On the other hand, where the roughness is smaller than the second set value, the fuel injection amount is compensated to make the intake gas mixture lean until the roughness is reduced greater than the second set value. Concurrently, the ignition timing is compensated to be advanced.

Through the above control of the fuel injection, the A/F is controlled so that the roughness is effectively controlled within the predetermined allowance between the first and second set values. This control is done on each of the cylinders so that the A/F is control to have as larger value as possible or the intake gas mixture is controlled as leaner as possible provided that the combustion condition of the engine is not deteriorated unduly. As a result, the fuel consumption efficiency can be improved and Nox is reduced by virtue of the leaner control of the intake gas mixture through the A/F control. Thus, the emission performance of the engine is improved. In this case, even if the A/F is changed due to the compensation of the fuel injection in response to the roughness control, the ignition timing is compensated to be optimized. As a result, the emission performance is improved in this respect.

As shown in FIG. 15, there is a relationship among the A/F, roughness and Nox emission. The optimized ignition timing is retarded as the A/F increases or the intake gas mixture is leaner. During the lean burn operation, the base fuel injection amount (fuel injection calculated in step S7 in FIG. 10) is determined to accomplish a leaner A/F α0 (providing a leaner intake gas mixture) and the base ignition timing is set at the optimized ignition timing in the leaner A/F α0. However, if the A/F is changed to a rich side to make the intake gas rich (α1 side) due to the roughness control, the ignition timing would result in being advanced as shown in FIG. 15 indicated by a line with small circles compared with the optimized timing at the changed A/F. As a result, the Nox emission increases. On the other hand, if the A/F is changed to a leaner side (α2), the ignition timing would result in being retarded as shown indicated by a line with triangles compared with the optimized timing to deteriorate the combustion stability.

Thus, according to the present invention, the ignition timing is concurrently compensated with the compensation of A/F to reduce Nox as low as possible and to improve the combustion stability. This means that the stable combustion limit based on the A/F control is enhanced the through the control of the present invention. Thus, the combination of the ignition timing control with the control for compensating the fuel injection in accordance with the roughness can synergistically affect to improve the leaner A/F, fuel consumption efficiency and emission performance.

The present invention is not limited to the above embodiment but many modification and variations can be made.

For example, the crank angle speed detecting element 41 can be a sensor for detecting a cycle and the like as far as they are equivalent to the crank angle speed.

In the aforementioned embodiment, the frequency components having 0.5 degree of the engine rotation, those having degrees of natural times of the engine rotation, and those of degrees lower than 0.5 degree of the engine rotation are excluded in all the operating condition. However, they may be excluded only in the high engine speed range since the influence of the explosive combustion causing crank angle vibration is increased in the engine high speed range.

In the above embodiment as shown in FIGS. 10 and 13, the learned value obtained through the learning control in the semi-warmed up condition is used for the fuel control in the various operating area. However, the learned value tends to be changed in a condition of a low intake gas amount in the vicinity of the idle operating area. Thus, it is preferable that the learned value is not used for other operating area in the case of low intake gas amount area as shown by a broken line in FIG. 4.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An engine combustion condition judging method for detecting a crank angle speed of a multiple cylinder engine to judge a combustion condition of each of cylinders of the engine based on the detection of the crank angle speed, wherein the improvement comprises steps of;

setting a predetermined crank angle range selectively determined within a range between a crank angle at which a combustion substantially terminates in a given cylinder and another crank angle at which a combustion substantially starts in the next cylinder to the given cylinder in an engine cycle for detecting a crank angle speed property, and judging the combustion condition based on said crank angle speed property within said predetermined crank angle range.

2. A method as recited in claim 1 wherein said predetermined crank angle range for detecting the crank angle speed property is determined in a second half of an expansion stroke of the engine cycle.

3. A method as recited in claim 1 wherein said predetermined crank angle range is determined within a range of 100° crank angle to 200° crank angle after a top dead center of the second half of the expansion stroke.

4. A method as recited in claim 1 wherein said predetermined crank angle range is set not smaller than 60° crank angle.

5. A method as recited in claim 1 wherein a crank angle speed or equivalent thereof is measured for detecting the crank angle speed property, and wherein frequency components corresponding to an engine explosive rotation degree are excluded in detecting the crank angle speed property.

6. A method as recited in claim 1 wherein the engine is provided with multiple cylinders, each of which combustion condition is judged, wherein a crank angle speed or equivalent thereof is measured for detecting the crank angle speed property, and wherein frequency components corresponding to an engine explosive rotation degree are excluded in detecting the crank angle speed property.

7. A method as recited in claim 1 wherein the frequency components corresponding to the explosive rotation degree of the engine can be removed by obtaining a difference in the detected data of the crank angle speed between the current cycle and the precedent cycle to obtain a crank angle speed change profile.

8. A method as recited in claim 6 wherein the frequency components corresponding to the engine explosive rotation degree is removed only in the high engine speed range.

9. A method as recited in claim 6 wherein a crank angle speed or equivalent thereof is measured for detecting the crank angle speed property, and wherein frequency components having degrees lower than 0.5 of the engine rotation is excluded in detecting the crank angle speed property.

10. An engine control method comprising steps of;

detecting a crank angle speed of a multiple cylinder engine, for judging a combustion condition of each of cylinders of the engine based on the detection of the crank angle speed, setting a predetermined crank angle range selectively determined within a range between a crank angle at which a combustion substantially terminates in a given cylinder and another crank angle at which a combustion substantially starts in the next cylinder for detecting a crank angle speed property, and judging the combustion condition based on said crank angle speed property within the predetermined crank angle range, and controlling an air fuel ratio based on the judgment of the combustion condition in a lean burn operation in which the air fuel ratio is controlled to a value greater than the theoretical value in a predetermined operating range of the engine.

11. A method as recited in claim 10 wherein an air fuel control ratio gain is controlled based on the combustion condition.

12. An engine control system, comprising;

crank angle speed detecting means for detecting a crank angle speed or equivalent thereto of an engine in a predetermined crank angle range selectively determined within a range between a crank angle at which a combustion substantially terminates in a given cylinder and another crank angle at which a combustion substantially starts in the next cylinder for detecting a crank angle speed property, combustion condition judging means for judging the combustion condition based on said crank angle speed property within the predetermined crank angle range, and, air fuel ratio control means for controlling an air fuel ratio of the engine in accordance with the judgment of the combustion condition judging means.

13. An engine control system as recited in claim 12 further comprising detected data processing means for excluding frequency components corresponding to an engine explosive rotation degree and those having degrees lower than 0.5 degree of the engine rotation.

14. An engine control system as recited in claim 12 wherein the air fuel ratio control means comprises an air fuel control gain setting means for setting a target air fuel control gain which provides a greater air fuel ratio than a theoretical air fuel ratio in a predetermined lean burn operation range and an air fuel ratio control gain compensation means for compensating the air fuel control gain base on the judgement to the combustion condition judgement means.

15. An engine control system as recited in claim 12 wherein the combustion condition judging means judges the combustion condition in the cylinder by comparing the crank angle speed change property with a first set value and a second set value lower than the first set value, the air fuel ratio compensation means compensates the air fuel ratio control gain to make an intake gas mixture rich when the crank angle speed fluctuation is greater than the first set value, and make the intake gas mixture lean when the crank angle speed fluctuation is smaller than the second set value.

16. An engine control system as recited in claim 12 wherein the crank angle speed detecting means detects the crank angle speed property or equivalent there to of the engine in the predetermined crank angle range selectively determined within the crank angle range between 100° crank angle and 200° crank angle after top dead center in the expansion stroke.

\* \* \* \* \*